May 13, 1941.　　　　L. E. WHITON　　　　2,241,564
CHUCK
Filed Dec. 10, 1938　　　2 Sheets-Sheet 1
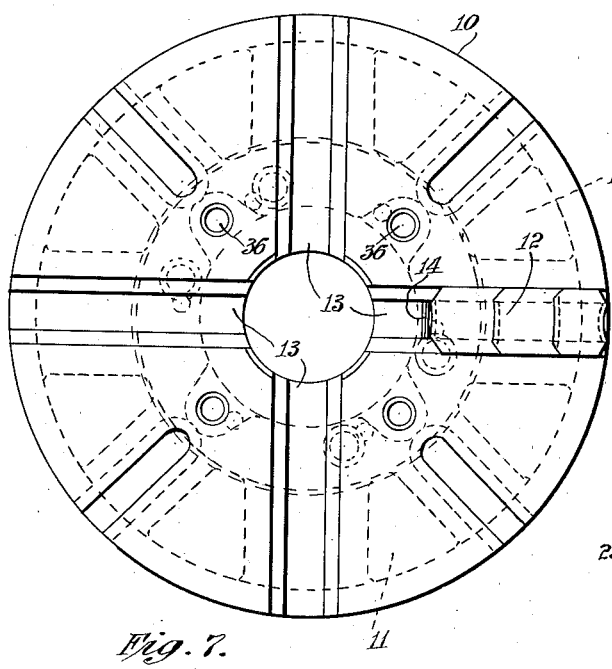
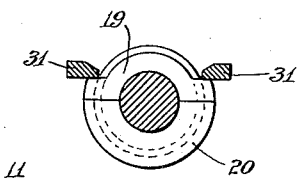
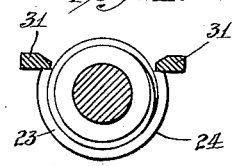
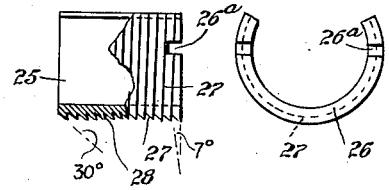
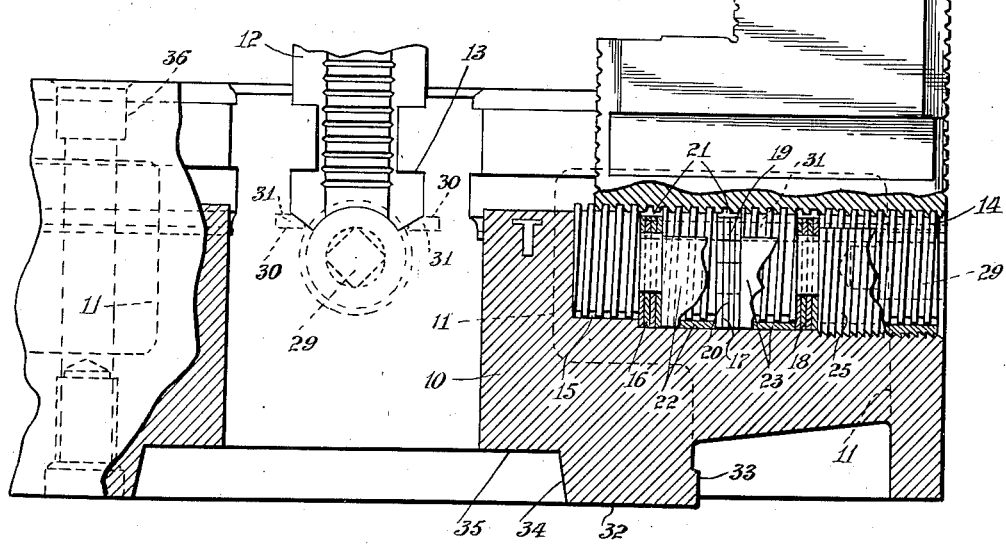
INVENTOR
Lucius E. Whiton
BY
ATTORNEY May 13, 1941.  L. E. WHITON  2,241,564
CHUCK
Filed Dec. 10, 1938  2 Sheets-Sheet 2

INVENTOR
Lucius E. Whiton
BY
ATTORNEY

Patented May 13, 1941

2,241,564

UNITED STATES PATENT OFFICE 2,241,564

CHUCK

Lucius E. Whiton, New London, Conn.

Application December 10, 1938, Serial No. 244,955

9 Claims. (Cl. 279—112)

This invention relates to chucks and has for its object to enhance the jaw clamping strength of a chuck of a given size.

Another object is to provide a chuck adapted for mounting in a variety of ways on a face plate or spindle.

Referring to the drawings

Fig. 1 is a front view of one embodiment of this invention.

Fig. 2 is a section through the device of Fig. 1 showing the jaw actuating screw and its thrust transmitting means.

Fig. 3 is an end view of the thrust members 16, 17 and 18.

Fig. 4 is an end or longitudinal view of the spacers 23.

Fig. 5 is a side view of the thrust bushing.

Fig. 6 is a right end view of the device of Fig. 5.

Fig. 7 is a perspective view of one of the keys or stops.

Figure 10:
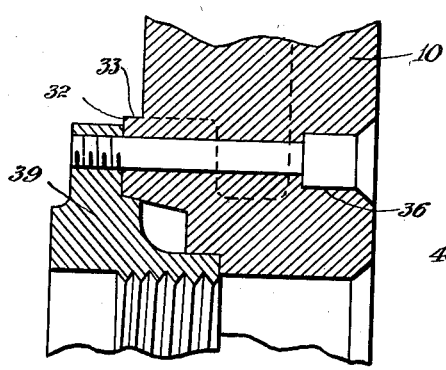

Fig. 10 exemplifies still another way of mounting the chuck on a plate having a hub projecting into the chuck.

Figure 11:
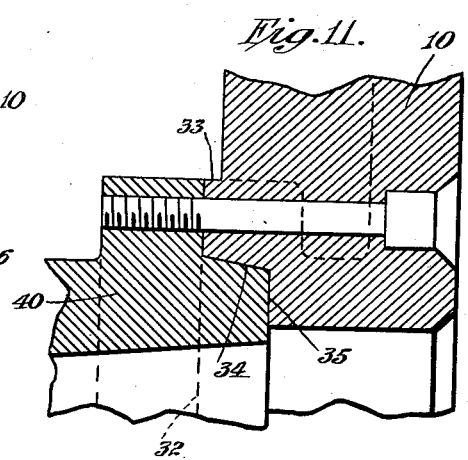

Fig. 11 illustrates the mounting of the chuck on a flanged spindle.

In chucks the provision of ample thrust transmitting surfaces between the chuck body and jaw adjusting screws has tended to weaken the chuck body because it has previously necessitated recesses of substantial size around the screw and through the chuck body. According to this invention the strength possible for a given size chuck has been increased and it has not been necessary to weaken the chuck body to such an extent because ways have been discovered for avoiding recesses of substantial size through the chuck body in order to provide adequate thrust receiving surfaces.

The chuck body 10 is provided with cored recesses 11 surrounding the screw recesses to reduce the weight of the casting and to provide a more uniform section reducing the likelihood of shrinkage pockets and porous places forming in the casting.

The usual jaws 12 slide in guideways or recesses 13 and are each actuated by an adjusting screw 14 which fits into an unthreaded recess 15. Intermediate its ends the screw 14 is provided with a number of portions of reduced diameter around which are located laminated thrust members 16, 17 and 18 as shown in Fig. 2. Each thrust member is made in two parts as shown in Fig. 3, the upper part 19 and the lower part 20. The recessed portions of the screw in which these laminated thrust members are located is indicated generally by the numeral 21. Between the thrust members are placed spacers 22 and 23 of the arcuate shape 24 shown in Fig. 4. These spacers transmit outward thrust on the jaw through the laminated thrust members to a thrust bushing 25 of the arcuate shape 26 shown in Figs. 5 and 6. The recesses 26a enable insertion of a tool in screwing the bushing into place in the chuck body.

From the drawings it will be apparent that the spacers 22 and 23 and the bushing 25 surround the threads of the screw 14. It has been discovered that an ordinary thread between the bushing 25 and the chuck body would be inappropriate because the inclined side faces of such a thread have a wedging effect which tends to cause the bushing 25 to become of reduced diameter and bind or clamp the threads of the screw 14 in an objectionable manner when heavy thrusts are placed on the bushing. To overcome this objection the bushing is provided with a buttress type thread 27 of the sort illustrated.

The provision of one face of the thread in a substantially vertical plane or slightly undercut about seven degrees as shown in Fig. 5 causes the bushing to tend to spread or open rather than bind upon the screw 14 with the imposition of heavy thrusts. As shown in Fig. 5 the other face of the thread illustrated is at an angle of about 30° to the axis.

The face 28 of the thread 27 when vertical or normal to the longitudinal axis should reduce any tendency for the thrust bushing to become of reduced diameter but due to wear it is found better to have these faces 28 of this buttress thread undercut a few degrees so as to cause an actual tendency for the bushing to become widened or of enlarged diameter under thrusts. Each of the screws 14 have the usual socket 29 to receive the wrench for adjusting the jaws. Adjacent the side of the jaw near the screw 14 are provided recesses 30 in which are placed keys or stops 31 as shown in Figs. 2, 4 and 7. These may be bevelled on one edge so as not to interfere with the bevelled edges of the jaw. This stop or key engages the ends of the spacers 22 and 23 and also the flat portions of the upper part 19 of the laminated thrust members and prevents these parts from getting out of place.

The face of the chuck body opposite that on which the jaws are located is provided with an annular supporting projection 32 having a radial outer surface 33 and a tapered inner surface 34 to a step 35 in the body of the chuck. Recesses 36 in the chuck body between the jaws enable bolts to secure the chuck body to a face plate or spindle as shown in Figs. 8 to 11 inclusive.

Figure 8:
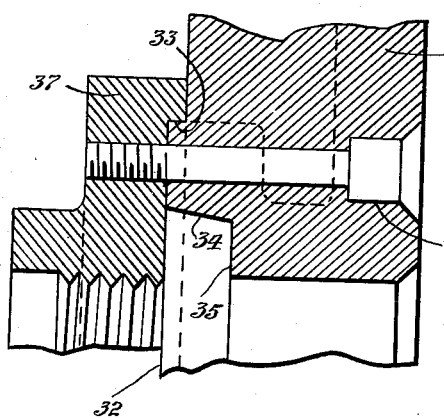
Fig. 8 shows one way of mounting the chuck to an adapter plate.

Fig. 8 exemplifies one type of adapter or face plate 37 shaped to engage the outer surface 33 of the supporting projection 32. When there is a good close fit between the outer surface 33 of the projection 32 and the contiguous flange of the adapter plate 37 the chuck will not only be centered but this flange of the adapter will be capable of reinforcing the chuck body to some extent against jaw thrusts.

Figure 9:
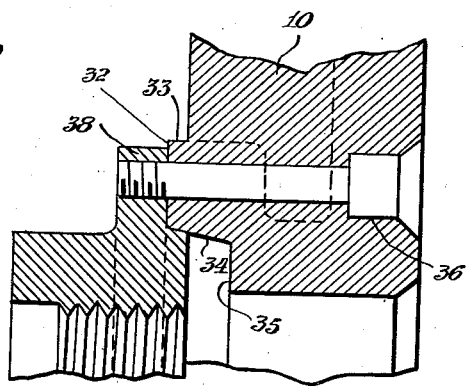
Fig. 9 shows another way of mounting the chuck to a face plate.

Fig. 9 shows the same chuck body 10 clamped to a face plate of lesser diameter than is shown in Fig. 8 and in this case it will be seen the face plate is provided with a central projection adapted to fit into the beveled face 34 of the chuck body to assist in centering the chuck.

The plate 39 of Fig. 10 is shaped similar to that in Fig. 9 except that it is adapted to extend into the chuck body a greater distance. In Fig. 10 the chuck body may or may not be of the same construction shown in the other figures. If not it may have the additional step shown as receiving the projection of plate 39. In Fig. 11 the chuck is shown to be mounted on an A. S. M. E. flanged spindle 40 which is not only contiguous the side face of the projection 32 in the chuck body but it also fits against the surfaces 34 and 35 of the chuck body to provide greater supporting and centering surfaces.

Among the advantages of this invention may be mentioned the possibility of reduced weakening of the chuck body around the jaw actuating screws since the presence of the thrust bushing 25 with its buttress type threads does not necessitate a mortise or recess through the chuck body to hold the thrust members 16, 17 and 18.

The buttress thread on the bushing 25 avoids the posibility of jaw thrusts tending to bind or clamp the screw and thrust bushing. Under this invention the effective thrust resisting section of the laminated members and the sectional thrust area of the bases of the buttress thread 27 may be at least as large as or greater than the effective sectional thrust area between the threads of the screw 14 and the jaw 12. The thrust members, being formed of laminated stampings, permit a rearrangement of the sequence of the stampings and thus provide an opportunity for fresh wearing surfaces at the thrust contact shoulders when some degree of wear or backlash has developed.

To assemble the screw 14 in position, the thrust members 16, 17 and 18 and the spacers 22 and 23 are placed around the screw before its insertion into the screw recess 15. After being inserted the bushing 25 is threaded into place contiguous the thrust members 18, the stop bars 31 having first been inserted into the recesses 30 to hold the thrust members and spacers in place against rotation. The ends of the bushing 25 will usually be engaged by the jaw to hold it against turning. The jaw may be screwed into its slot or guideway after the thrust members and bushings have been permanently put in place.

The laminations are preferably all .062 inch in thickness, but practically this is not necessary as laminations of different thicknesses may be used so long as the thickness of an assembled group corresponds with the axial length of the reduced portion of the screw. The stop 31 extends from the left end of the thrust members 16 to the right end of the thrust members 18 shown in Fig. 2 and does not project into engagement with the threaded bushing 25, but only engages the thrust members and spacers. The undercut type buttress thread illustrated should not be necessary though preferable. It is desirable, however, that the nearly vertical face of this thread should not be inclined from the vertical in Figs. 2 and 5 in a direction which might cause contraction of the slightly yieldable thrust bushing and thus cause this bushing to bind upon the screw in case of heavy thrusts.

I claim:

1. In a chuck, a jaw, a screw actuating the jaw, means for transmitting jaw thrusts from said screw to the body of said chuck including, a thrust member located in a portion of the screw of reduced diameter, a longitudinal key engaging said thrust member and chuck body to prevent rotation of said thrust member, an open side thrust bushing transmitting a jaw thrust from said member to the body of the chuck, said bushing having threaded engagement with the body of the chuck, said thrust member being of no larger diameter than said bushing whereby the body of said chuck may be unweakened by any mortise or recess therethrough to hold said thrust member.

2. A chuck comprising a radial screw, a jaw in threaded engagement with said screw, a thrust member engaging a portion of the screw of reduced diameter, an open side thrust bushing engaging said thrust member and threaded on the outside to transmit jaw thrusts from said thrust member to the body of the chuck, the threads on said bushing being shaped to prevent contraction in diameter of the bushing on the application of thrusts whereby there will be no tendency for the thrust bushing to bind on or clamp the screw.

3. In a chuck, a jaw, a screw actuating the jaw, means for transmitting jaw thrusts from said screw to the body of said chuck including, a thrust member located in a portion of the screw of reduced diameter, an open side thrust bushing transmitting a jaw thrust from said member to the body of the chuck, said bushing having threaded engagement with the body of the chuck, the thread on said bushing being of a buttress type.

4. In a chuck, a jaw, a screw actuating the jaw, means for transmitting jaw thrusts from said screw to the body of said chuck including, a thrust member located in a portion of the screw of reduced diameter, an open side thrust bushing transmitting a jaw thrust from said member to the body of the chuck, said bushing having threaded engagement with the body of the chuck, the thread on said bushing being of a buttress type with one face undercut.

5. A chuck having jaws, a screw for actuating each jaw, a laminated thrust member located in a recessed portion of each screw and a thrust abutment adjustably secured to the body of said chuck to control the compression on said member.

6. A chuck body having a jaw, a screw for actuating the same, thrust members each located in a portion of said screw of reduced diameter, spacers outside said screw for transmitting jaw thrust on the thrust members, and means secured to the chuck body outside said screw for transmitting jaw thrusts on said thrust members and the spacers to the chuck body.

7. A chuck body having a screw threaded jaw slidable radially of the chuck body, a screw in the body in threaded engagement with said jaw, a recess in which the screw is located and means intermediate the ends of said screw for transmitting thrusts from said jaw and screw to the chuck body, said thrust transmitting means being at least as large in effective area as the thrust area of thread engagement between screw and jaw, and including a split thrust bushing substantially surrounding said screw for a portion of its length, and a thrust member of not substantially larger diameter than said bushing and located in a portion of the screw of reduced diameter.

8. A chuck comprising a jaw, a screw for adjusting the jaw radially, spaced thrust members locating in recessed portions of the screw, the effective thrust transmitting area between the screw and members being at least about equal to the thrust contact area between the screw and jaw, a spacer between each pair of thrust members, a bushing receiving thrusts from said members and transmitting the same to the body of the chuck, and means interfitting the chuck body and bushing, the thrust sectional area of said interfitting means between the bushing and chuck body being at least equal to about the sectional thrust contact area between the screw and jaw.

9. A chuck having a holding jaw, an adjusting screw for said jaw, a thrust member engaging an intermediate portion of the screw of reduced diameter and receiving jaw clamping thrusts from said screw, a radially yieldable thrust bushing surrounding said screw and receiving the thrusts from the thrust member and transmitting them to the body of the chuck, said bushing having a threaded connection with the chuck body by means of an undercut buttress type thread whereby longitudinal thrusts on said bushing tend to slightly expand the same radially.

LUCIUS E. WHITON.